(12) United States Patent
Aikawa et al.

(10) Patent No.: US 6,190,028 B1
(45) Date of Patent: Feb. 20, 2001

(54) SURFACE-COATED, MOLDED RESIN ARTICLES FOR VEHICLE LIGHTING EQUIPMENT

(75) Inventors: Shinji Aikawa; Koichi Nakamura; Michihiro Mabe, all of Shizuoka (JP)

(73) Assignee: Koito Manufacturing Co., Ltd., Tokyo (JP)

( * ) Notice: Under 35 U.S.C. 154(b), the term of this patent shall be extended for 0 days.

(21) Appl. No.: 09/149,664

(22) Filed: Sep. 9, 1998

(30) Foreign Application Priority Data

Sep. 12, 1997 (JP) .................................................. 9-248083

(51) Int. Cl.$^7$ ....................................................... B05D 5/00
(52) U.S. Cl. .......................... 362/510; 362/516; 362/293; 428/429; 428/447
(58) Field of Search ..................................... 362/510, 509, 362/516, 311, 293, 351; 428/429, 447, 451, 450, 412

(56) References Cited

U.S. PATENT DOCUMENTS

| | | | |
|---|---|---|---|
| 4,525,426 | * | 6/1985 | Anthony ................................ 428/447 |
| 4,653,927 | * | 3/1987 | Flynn et al. ........................... 264/134 |
| 4,914,143 | * | 4/1990 | Patel ...................................... 522/148 |
| 4,990,376 | * | 2/1991 | Patel ...................................... 427/387 |
| 5,292,784 | * | 3/1994 | McKinney et al. ..................... 524/80 |
| 5,618,626 | * | 4/1997 | Nagashima et al. .................. 428/428 |
| 5,939,182 | * | 8/1999 | Hunang et al. ....................... 428/323 |

* cited by examiner

Primary Examiner—Thomas M. Sember
(74) Attorney, Agent, or Firm—Sughrue, Mion, Zinn, Macpeak & Seas, PLLC

(57) ABSTRACT

A surface-coated, molded resin article for vehicles composed of a substrate (100) made of a resin, a plate layer (101) formed on the surface of the substrate (100) and coating films formed on the surface of the plate layer (101) wherein two or more different silicone-based coating films (102), (103) containing UV absorbers are laminated on each other. The lower coating film (102) is a light-reflective pearl film, while the upper coating film (103) is a film having a desired color. The UV rays are absorbed by the UV absorber contained in each coating film, to reduce the amount of UV rays that reach the interface between the plate layer 101 and the coating film 102, thus, peeling of the coating films can be effectively prevented. The lower coating film 102 reflects the external rays and provides a glossy appearance, thus contributing to the improvement in the appearance as a metallic coating.

15 Claims, 4 Drawing Sheets

SURFACE-COATED, MOLDED RESIN ARTICLES FOR VEHICLE LIGHTING EQUIPMENT

1. FIELD OF THE INVENTION

This invention relates to molded resin articles which are employed in lighting equipment, lighted displays, etc. of vehicles. More particularly, it relates to surface-coated molded resin articles of vehicles.

2. BACKGROUND OF THE INVENTION

Lighting equipment of, for example, automobiles, is composed of molded resin, or lighting bodies, combined with bulbs and lenses. It has been a practice to paint lighting bodies a desired color to match the color of the vehicle body. When the vehicle body is a so-called metallic color, then the lighting bodies are also painted metallic.

FIG. 4(a) shows the sectional view of a conventional metallic coating of a lighting body wherein a plate layer 201 is formed, for example, by an electroplating method, on the surface of a substrate 200 made of a molded resin and a coating film 202 of a desired color is further formed on the surface of the plate layer 201. Since the plate layer 201 is formed as the undercoating layer of the coating film 202, externally irradiated rays permeate through the coating film 202, reflected by the plate layer 201 and then radiate outside through the coating film 202, thus giving a metallic and glossy appearance.

In the conventional coating structure as described above, urethane-based coatings that have relatively high permeability to UV rays (ultraviolet rays) are employed in the coating film 202. Thus, UV rays which irradiate from outside would permeate through the coating film 202 and reach the plate layer 201. As a result of the influence of UV rays, the surface of the plate layer 201 deteriorates and its reflectance lowers.

At the same time, another problem arises. The coating film 202 deteriorates at the interface with the plate layer 201 so that its adhesiveness to the plate layer 201 worsens, thus causing peeling of the coating film 202. To solve this problem, it has been a practice to thicken the coating film 202. However, the thickened coating causes the permeability to lower. As a result, the rays reflected by the plate layer 201 can barely radiate outside and thus the glossiness which gives the desired metallic color cannot be achieved.

Furthermore, when the substrate is provided with sharp-edged projections, as will be described hereinafter, the coating film is typically thinner at these edges. As a result, the above-mentioned peeling of the coating film becomes conspicuous on these edges.

Accordingly, attempts have been made in the conventional art to form a plate layer 301 on a substrate 300 and then form, on the surface of the plate layer 301, a coating film 302 made of a coating containing an UV absorber. Thus, the UV rays reaching the plate layer 301 are reduced by this coating film 302. Although this coating structure is useful in reducing the UV rays that reach the plate layer 301, it is still difficult to satisfactorily solve the problem that a thin coating film 302 peels easily while a thick coating film 302 lessens the glossiness characteristic.

SUMMARY OF THE INVENTION

An object of the present invention is to provide surface-coated, molded resin articles for vehicles in which deterioration of plate layers and peeling of coating films can be effectively prevented while obtaining a desired glossy appearance.

A surface-coated, molded resin article is composed of a resin substrate, a plate layer formed on the surface of the substrate and coating films formed by applying coatings onto the surface of the plate layer. The coating films consist of two or more coating films wherein two or more different silicone-based coatings containing UV absorbers are laminated on each other. The coating films are composed of two layers including the lower coating film and the upper coating film and the lower coating film is a light-reflective coating film. In this case, it is preferable that the surface of the substrate is provided with projections each having a curved edge.

DETAILED DESCRIPTION OF THE INVENTION

Figure 1:
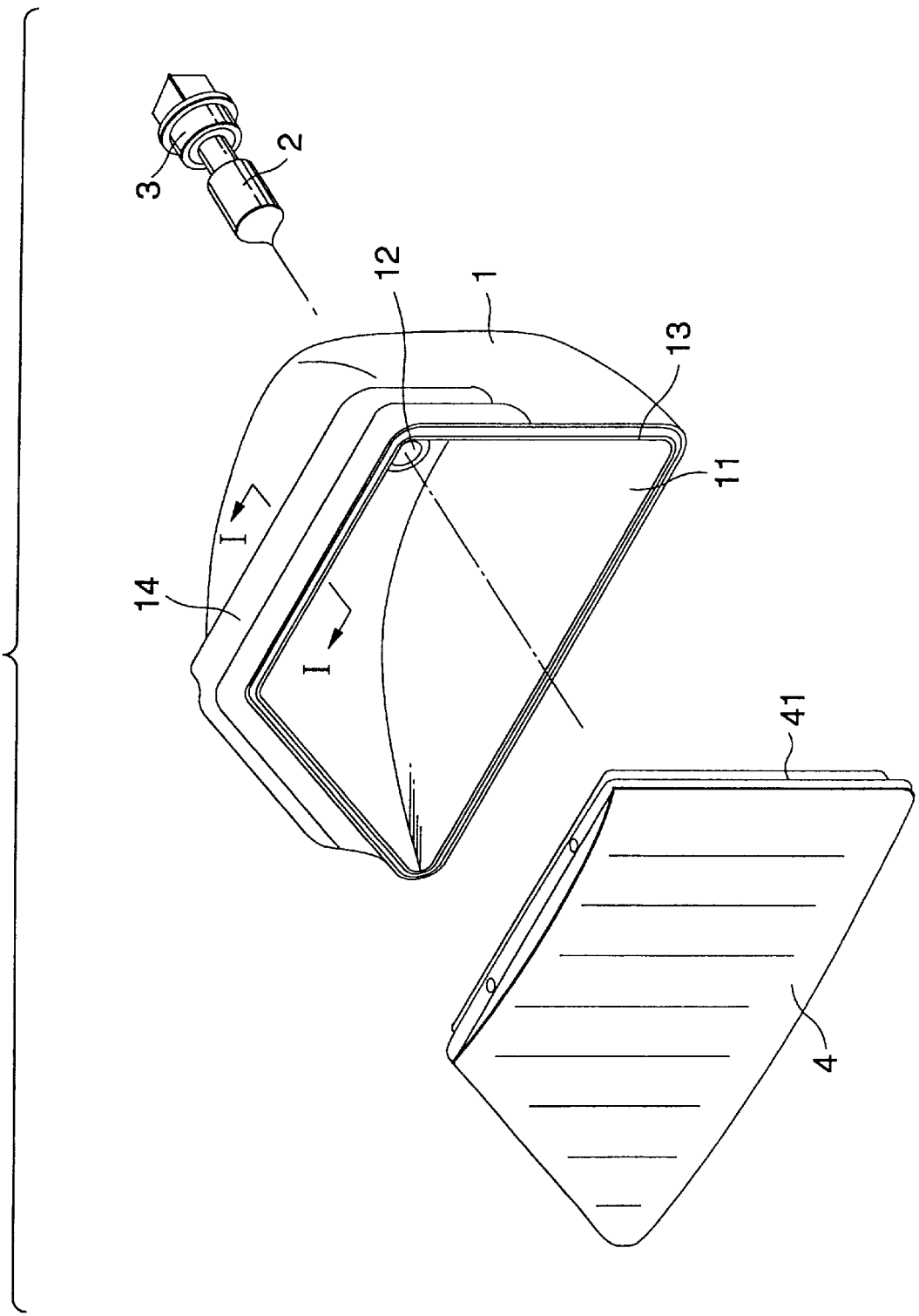
FIG. 1 is a partial perspective illustration of the embodiment of an automotive lighting equipment to which the present invention is applied.

Now, the embodiment of the present invention will be described by reference to the drawings. FIG. 1 is a partial perspective illustration of the embodiment of an automotive lighting equipment to which the present invention is applied.

A lighting body 1 is obtained by molding a substrate 100 made of an acrylonitrile-butadiene-styrene (ABS) resin into a container shape having an opening 11 in the front. A bulb-mounting hole 12 is formed at the back of the body 1 for fitting a bulb socket 3 supporting a bulb 2, which is employed as a light source, thereinto. A lens 4 is put into the opening 11 at the front. A seal foot 41 provided around the periphery of the lens 4 is engaged with a seal groove 13 formed around the periphery of the opening 11 at the front of the lighting body 1 and then fixed with a sealing material (not shown). The upper or side edge of the lighting body 1 is provided with a cover 14 for covering the space between the lighting body and an automotive body (not shown), thus improving the overall appearance.

Figure 2A:
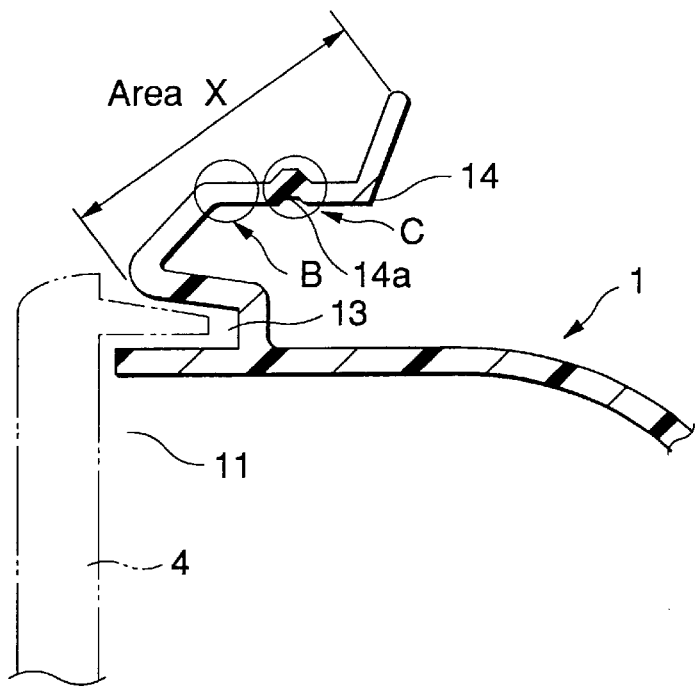
FIG. 2(a) and FIG. 2(b) are sectional views of the lighting equipment of FIG. 1 along the line I—I and an enlarged detail of the main part thereof.
Figure 2B:
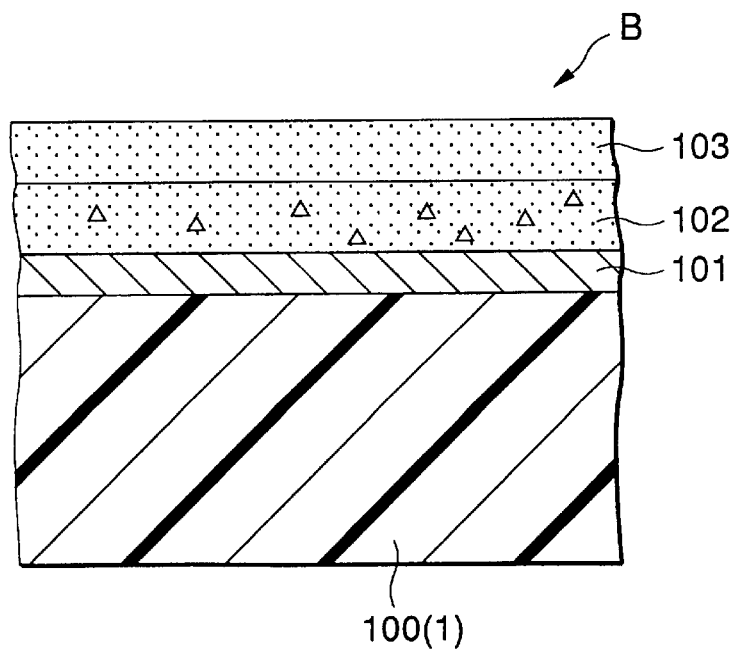

A metallic coating is applied to the surface of the lighting body 1 including the cover 14, as shown in an Area X shown in FIG. 2(a). FIG. 2(a) is a section view of the cover 14 shown in FIG. 1 along the line I—I, while FIG. 2(b) is an enlarged detail of the part B thereof.

On the surface of the substrate 100 of the molded resin lighting body 1, a plate layer 101 of a metal such as chromium, is formed by an electroless plating method. In this case, the plate layer 101 which is formed on the inner surface of the lighting body 1 serves as a reflector. Therefore, when chromium-plating is used it is possible to simultaneously form the reflector and the plate layer. Moreover, because the lighting body 1 is made of an ABS resin, the lighting body 1 adheres well to the plate layer.

Figure 3A:
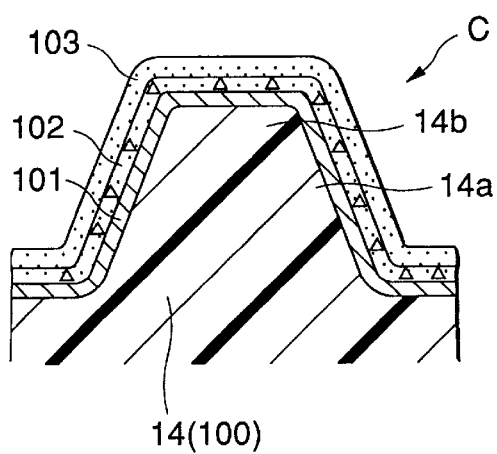
FIG. 3(a) and FIG. 3(b) are sectional views of a projection of the present invention and that of a conventional one.

As FIG. 3(a) shows, projections 14a are formed in the part C in the cover 14 shown in FIG. 2(a). When such a projection 14a has an edge 14b, the resin is molded in such a manner that the edge 14b has a curved sectional shape so as to form a round edge 14b. The round edge 14b may be obtained by using a curved mold when the resin is being shaped into the edge.

On the surface of the above-mentioned plate layer 101, a first coating film 102 is formed by applying an acrylic silicone-based coating containing a UV absorber. On the surface of this first coating film 102, a second coating film 103 is further formed by similarly applying an acrylic silicone-based coating containing an UV absorber. The first coating film 102 is a so-called non-specular pearl film made of a transparent coating mixed with silver metallic powders or fine particles of aluminum, etc. On the other hand, the second coating film 103 is a coating film of a desired color (in this case, the same color, i.e., red as that of the automotive body). The total thickness of the first coating film 102 and the second coating film 103 is comparable to those of the above-mentioned conventional coating films or exceeds them.

In this coating structure, external rays would permeate through the second and first coating films 103 and 102, and through these coating films reach the plate layer 101. During this process, UV rays are absorbed by the UV absorbers contained in the second and first coating films 103 and 102. Thus, only a reduced amount of UV rays reach the interface between the plate layer 101 and the first coating film 102. Since the total thickness of the second and first coating films 103 and 102 may exceed those of the conventional films, a larger amount of UV rays are absorbed with the present invention. As a result, the deterioration of coatings due to UV rays at the interface between the plate layer 101 and the first coating film 102 and peeling of the coating films can be effectively prevented. Since the first coating film 102 is a light-reflective pearl coating film, rays permeating into the first coating film 102 are partly reflected by the coating film 102.

Accordingly, the rays getting to the interface with the plate layer 101 are further reduced. Thus, peeling of the first coating film 102 can be more effectively prevented.

Although the total thickness of the first and second coating films 102 and 103 exceeds those of the conventional coating films, the first coating film is a pearl coating film capable of reflecting a part of the external rays. Thus, not only the UV rays but visible rays are reflected by the first coating film 102 and then radiated outside through the second coating film 103. Namely, the rays reflected by the plate layer 101 and those reflected by the first coating film 102 are together radiated outside and provide a glossy appearance in the color of the second coating film 103, thus contributing to the improvement in the appearance of the metallic coating. Moreover, the pearl coating film used as the lower layer contributes to the improvement in the adhesiveness to the plate layer since the stress caused by the external rays is reduced.

Figure 3B:
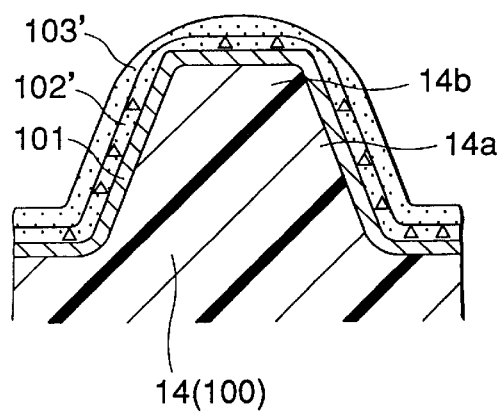

In this embodiment, moreover, the edge 14b of the projection 14a formed on the cover 14 is curved. Therefore, it is possible to form the first and second films 102 and 103 in a substantially uniform thickness on the edge 14b, as shown in FIG. 3(a). In the case of the conventional sharp-edged projections, the coating films 102' and 103' become thinner on the edge 14b, as shown in FIG. 3(b), and are seriously damaged at the thinned parts due to UV rays. As a result, peeling becomes conspicuous in these parts.

Figure 4A:
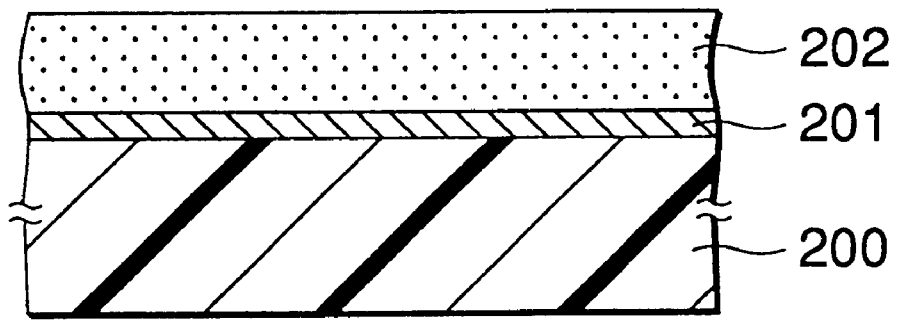
FIG. 4(a) and FIG. 4(b) are sectional views of conventional coating structures.
Figure 4B:
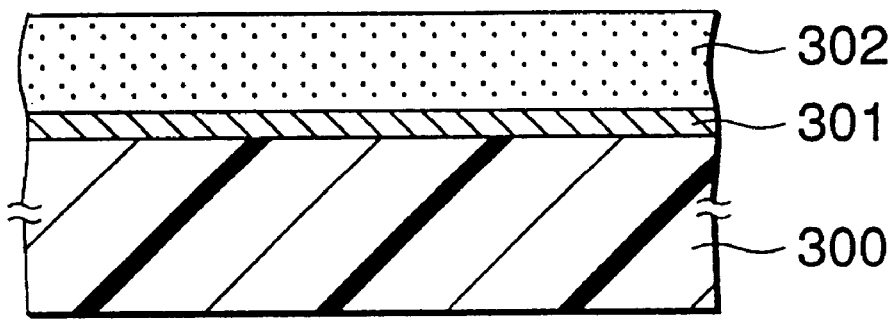

Table 1 shows the results of an experiment in which the coating structures of the present invention are compared with the conventional ones. As the comparative coating films, use is made of an example with an UV absorber-free urethane-based coating film of FIG. 4(a) (Comparative Example 1) and an UV absorber-containing urethane-based coating film of FIG. 4(b) (Comparative Example 2).

As Table 1 shows, peeling of the coating films of Comparative Example 1 can be suppressed to a certain extent by forming a thick film of about 40 $\mu$m. However, the preventive effect is still insufficient. Moreover, in this case, the glossiness is deteriorated. Thus, these coating films are not practical.

In the case of the coating films of Comparative Example 2, peeling can be prevented to a certain extent at a film thickness of about 20 $\mu$m. However, the glossiness is deteriorated and thus it is difficult to match the metallic color of the vehicle.

In contrast, in the coating structure of the present invention, a little peeling is observed when the thickness of the second coating film is less than 10 $\mu$m or the thickness of the first coating film is 5 $\mu$m. However, peeling can be almost completely prevented by thickening the coating films. Excellent glossiness can be obtained even though the total thickness of the first and second coating films is 20 $\mu$m or more, which suggests that these coating films are usable in practice. Furthermore, by forming coating films of a total thickness of 20 $\mu$m or more, it becomes possible to improve the weathering characteristics, for example, prevention of the plate layer from rusting.

Although acrylic silicone-based coatings are employed in the above-mentioned embodiment, it is also possible to use, for example, polyester silicone, silicone-modified alkyd and silicone-modified urethane-based coatings. As the above-mentioned UV absorbers, use can be made of publicly known ones such as benzophenone, benzotriazole and phenyl salicylate compounds. The first coating film is not restricted to the above-mentioned pearl coating film, so long as it is a light-reflective one.

Although the present invention is applied to an automotive front light in the above-mentioned embodiment, it is also applicable to other lighting bodies. Furthermore, it is applicable to molded resin articles other than lighting equipment, for example, displays and decorative parts.

As described above, the surface-coated, molded resin article for a vehicle of the present invention is composed of a substrate made of a resin, a plate layer formed on the surface of the substrate and coating films formed by applying coatings onto the surface of the plate layer. These coating films consist of two or more coating films wherein two or more different silicone-based coatings containing UV absorbers are laminated on each other. In this structure, UV rays are absorbed by the UV absorbers contained in the coating films and, therefore, only a reduced amount of the UV rays can get to the interface between the plate layer and the coating film. Thus, the deterioration of the plate layer can be prevented and, at the same time, the peeling of the coating films can be effectively prevented.

On the other hand, the lower coating film is a light-reflective coating film by which external rays can be effectively reflected. Therefore, an improved metallic glossy appearance in the color of the upper coating film can be achieved even though the coating films have a large film thickness. Moreover, the pearl coating film used as the lower layer contributes to the improvement in the adhesiveness to the plate layer due to the capability of relieving the internal stress. Since the projections have curved edges, furthermore, the coating films do not become thinner along the edges and thus peeling on the edges can be prevented.

TABLE 1

| | Coating film thickness (μm) | | UV permeability (%) | Peeling sites | Film Glossiness (evaluated with the naked eye) |
|---|---|---|---|---|---|
| | Pearl | Red | | | |
| Present Invention: UV-absorber containing acrylic silicone (2 layers) | 5 | 5 | 3 | few | ⊚ |
| | 5 | 10 | 1.5 | few | ⊚ |
| | 5 | 15 | 0.15 | no | ○ |
| | 5 | 20 | 0.075 | no | ○ |
| | 10 | 5 | 2 | few | ⊚ |
| | 10 | 10 | 1 | no | ⊚ |
| | 10 | 15 | 0.1 | no | ○ |
| | 10 | 20 | 0.05 | no | ○ |
| Comparative Example 1: urethane-based coating (1 layer) | 7 | | 50 | many | ⊚ |
| | 10 | | 30 | many | ⊚ |
| | 15 | | 18 | many | ⊚ |
| | 21 | | 5 | moderate | ○ |
| | 40 | | 1.2 | moderate | △ |
| | 5 | | 5 | many | ⊚ |
| Comparative Example 2: UV-absorber-containing acrylic silicone (1 layer) | 10 | | 3 | many | ⊚ |
| | 15 | | 2 | moderate | ○ |
| | 20 | | 0.1 | few | △ |

What is claimed is:

1. A surface-coated, molded resin article for vehicles, comprising:

a substrate made of a molded resin;

a plate layer formed on a surface of said substrate; and two or more coating films formed on the surface of said plate layer, wherein said two or more coating films include two or more different silicone-based coatings containing UV absorbers laminated on each other;

wherein said two or more coating films are composed of two layers including a lower coating film and an upper coating film, and said lower coating film reflects at least visible light and UV radiation.

2. The surface-coated, molded resin article for vehicles as claimed in claim 1, wherein projections each having a curved edge are formed on the surface of said substrate.

3. The surface-coated, molded resin article for vehicles as claimed in claim 1, wherein a total thickness of said two or more coating films is at least 20 microns.

4. The surface-coated, molded resin article for vehicles as claimed in claim 1, wherein said plate layer is a metallic plate layer which reflects light in a visible wavelength range.

5. The surface-coated, molded resin article for vehicles as claimed in claim 1, wherein said upper coating film has a desired color.

6. A lighting body of a vehicle comprising:

a molded resin substrate;

a plate layer; and at least two coating layers, wherein said at least two coating layers include an upper layer and a lower layer, and said upper layer has a desired color and said lower layer is formed by a light-reflective pearl film, and further wherein said upper layer and said lower layer are silicone-based coating films which contain UV-absorbers, for reducing the peeling of the layers due to exposure of UV rays and for improving a metallic appearance of the lighting body.

7. The lighting body of a vehicle as claimed in claim 6, wherein said lighting body is formed into a container shape having an opening in the front, and said lighting body includes a cover which is formed on the periphery of said opening and has a surface on which said plate layer and said at least two coating layers are formed.

8. The lighting body of a vehicle as claimed in claim 6, wherein a total thickness of said at least two coating layers is at least 20 microns.

9. The lighting body of a vehicle as claimed in claim 6, wherein said plate layer is a metallic plate layer which reflects light in a visible wavelength range.

10. The lighting body of a vehicle as claimed in claim 6, wherein said light-reflective pearl film reflects at least visible light and UV radiation.

11. A surface-coated, molded resin article for vehicles, comprising:

a substrate made of a molded resin;

a plate layer formed on a surface of said substrate; and two or more coating films formed on the surface of said plate layer, wherein said two or more coating films include two or more different silicone-based coatings containing UV absorbers laminated on each other;

wherein projections each having a curved edge are formed on the surface of said substrate.

12. The surface-coated, molded resin article for vehicles as claimed in claim 11, wherein said upper coating film has a desired color.

13. The surface-coated, molded resin article for vehicles as claimed in claim 11, wherein said two or more coating films are composed of two layers including a lower coating film and an upper coating film, and said lower coating film reflects at least visible light and UV radiation.

14. The surface-coated, molded resin article for vehicles as claimed in claim 11, wherein a total thickness of said two or more coating films is at least 20 microns.

15. The surface-coated, molded resin article for vehicles as claimed in claim 11, wherein said plate layer is a metallic plate layer which reflects light in a visible wavelength range.

* * * * *